United States Patent [19]

Mallary

[11] Patent Number: 5,184,267
[45] Date of Patent: Feb. 2, 1993

[54] TRANSDUCER WITH IMPROVED INDUCTIVE COUPLING

[75] Inventor: Micheal L. Mallary, Berlin, Mass.

[73] Assignee: Digital Equipment Corporation, Maynard, Mass.

[21] Appl. No.: 603,162

[22] Filed: Oct. 25, 1990

Related U.S. Application Data

[63] Continuation-in-part of Ser. No. 360,334, Jun. 2, 1989, abandoned.

[51] Int. Cl.[5] .................. G11B 5/147; G11B 5/17; B32B 9/00
[52] U.S. Cl. .................. 360/126; 360/123; 360/125; 428/336
[58] Field of Search ............ 360/119, 123, 126, 125; 29/603; 428/336

[56] References Cited

U.S. PATENT DOCUMENTS

| | | | |
|---|---|---|---|
| 3,549,825 | 12/1970 | Trimble | 179/100.2 |
| 3,967,368 | 7/1976 | Brock | 29/603 |
| 4,100,583 | 7/1978 | Koel et al. | 360/113 |
| 4,165,525 | 8/1979 | Koel et al. | 360/113 |
| 4,223,360 | 9/1980 | Sansom et al. | 360/123 |
| 4,335,410 | 6/1982 | Neu | 360/123 |
| 4,374,403 | 2/1983 | Oshima et al. | 360/113 |
| 4,376,337 | 3/1983 | Kobayasi et al. | 360/123 |
| 4,535,375 | 8/1985 | Mowry et al. | 360/113 |
| 4,566,050 | 1/1986 | Beam et al. | 360/113 |
| 4,613,918 | 9/1986 | Kanai et al. | 360/113 |
| 4,626,946 | 12/1986 | Vinal | 360/113 |
| 4,626,947 | 12/1986 | Narishige et al. | 360/126 |
| 4,639,811 | 1/1987 | Diepers et al. | 360/125 |
| 4,649,447 | 3/1987 | Huang et al. | 360/113 |
| 4,656,546 | 4/1987 | Mallary | 360/110 |
| 4,663,685 | 5/1987 | Tsang | 360/113 |
| 4,668,913 | 5/1987 | Vinal | 324/235 |
| 4,695,351 | 9/1987 | Mallary | 204/15 |
| 4,698,711 | 10/1987 | Vinal | 360/113 |
| 4,745,506 | 5/1988 | Nakamura et al. | 360/123 |
| 4,803,580 | 2/1989 | Mowry | 360/113 |
| 4,816,947 | 3/1989 | Vinel et al. | 360/113 |
| 4,825,318 | 4/1989 | Hoo et al. | 360/121 |
| 4,891,725 | 1/1990 | Mowry | 360/113 |
| 4,912,584 | 3/1990 | Mallary et al. | 360/126 |
| 4,931,886 | 6/1990 | Mallary | 360/125 |
| 5,027,247 | 6/1991 | Nakanishi | 360/126 |
| 5,085,935 | 2/1992 | Mallary | 360/126 |
| 5,089,334 | 2/1992 | Mallary | 428/336 |

FOREIGN PATENT DOCUMENTS

| | | |
|---|---|---|
| 0114076 | 7/1984 | European Pat. Off. . |
| 0147126 | 7/1985 | European Pat. Off. . |
| 0154005 | 9/1985 | European Pat. Off. . |
| 0353911 | 2/1990 | European Pat. Off. . |
| 54-5710 | 1/1979 | Japan .................. 360/126 |
| 57-164416 | 10/1982 | Japan . |

OTHER PUBLICATIONS

Maruyama et al.; A yoke magnetoresistive head for high track density recording; *IEEE;* 1987; pp. 2503-2505.

Vinal, (IBM Technical Disclosure Bulletin, vol. 25, No. 7B, Dec. 1983).

Jeffers, "Magnetoresistive Transducer With Canted Easy Axis," *IEEE Transactions on Magnetics,* vol. Mag-15, No. 6, Nov. 1979, pp. 1628-1629.

Oshiki, "A Thin-Film Head For Perpendicular Magnetic Recording," J. Appl. Phys. 53(3), Mar. 1982, pp. 2593-2595.

(List continued on next page.)

*Primary Examiner*—A. J. Heinz
*Assistant Examiner*—Jefferson Evans
*Attorney, Agent, or Firm*—Fish & Richardson

[57] ABSTRACT

A thin film magnetic transducer formed in multiple layers and comprising a yoke having a plurality of arms, at least one of which has segments lying in separate layers and connected through a transition layer, and a multiturn coil intertwined with the yoke to provide at least two flux interactions between the yoke and coil. The transducer is constructed to enhance flux conduction by rotation and minimize flux conduction by wall motion in the yoke.

43 Claims, 6 Drawing Sheets

OTHER PUBLICATIONS

Potter, "Self-Consistent Computer Calculations For Perpendicular Magnetic Recording," *IEEE Transactions on Magnetics*, vol. MAG-16, No. 5, Sep. 1980, pp. 967-972.

Shinagawa, "Simulation of Perpendicular Recording on Co-Cr Media With A Thin Permalloy Film-Ferrite Composite Head," J. Appl. Phys. 53(3), Mar. 1982, pp. 2585-2587.

Iwaski, "An Analysis For The Magnetization Mode For High Density Magnetic Recording," *IEEE Transactions on Magnetics*, vol. MAG-13, No. 5, Sep. 1977, pp. 1272-1277.

Mallary et al., "Frequency Response of Thin-Film Heads With Longitudinal And Transverse Anisotropy," *IEEE Transactions on Magnetics*, vol. 26, No. 5, Sep. 1990, pp. 1334-1336.

Mallary et al., "Three-Dimensional Transmission Line Model For Flux Conduction In Thin-Film Recording Heads," J. Appl. Phys. 67(9), May, 1990, pp. 4863-4865.

Mallary et al., "Conduction of Flux At High Frequencies By a Charge Free Magnetization Distribution," *IEEE Transactions on Magnetics*, vol. 24, No. 6, Nov. 1988, 2374-2376.

Michael L. Mallary; "Conduction of flux at high frequencies in Permalloy strips by small-angle rotations"; J. Appl. Phys. 57(1), Apr. 15, 1985; pp. 3952-3954.

Lazzari et al., A New Thin Film Head Generation, *IEEE*; 1989; pp. 31903193.

W. W. Chow; IBM Technical Disclosure Bulletin; vol. 24, No. 9; Feb. 1982; Multi-Turn Core and Winding For Thin Film Inductive Head; p. 4479.

TRANSDUCER WITH IMPROVED INDUCTIVE COUPLING

This is continuation in part of Ser. No. 07/360,334, filed Jun. 2, 1989; now abandoned.

BACKGROUND OF THE INVENTION

This invention relates to thin film magnetic transducers (i.e., heads).

Referring to FIG. 1, a typical thin film magnetic head 10 for writing information on or reading information from a recording medium 12, such as a magnetic disk, resembles a horseshoe-shaped yoke 14 of ferromagnetic material (such as nickel-iron) around which a coil 16 is wrapped. Yoke 14 includes a pair of pole pieces 18 the tips of which are located closely adjacent to medium 12.

Information is written on medium 12 by passing electrical current through coil 16 to induce a corresponding magnetic flux in yoke 14. The magnetic flux is conducted through one of the pole pieces 18 to medium 12 via the tip of the pole piece. Changes in the flux caused by varying the electrical current are recorded as magnetic transitions on medium 12. The flux circuit is completed by the return of the magnetic flux to thin film head 10 via the other pole piece. During reading, as head 10 is passed over a pair of magnetic transitions 15, 16 (known as a di-bit) on medium 12, flux emanating from positive transition 15 is conducted up through the one of the pole pieces 18 and returned by the other pole piece to the negative transition 16. The flux conduction through yoke 14 induces a corresponding electrical signal in coil 16.

The amount of flux imparted to the yoke during writing by the coil depends upon the write current level, the number of coil turns, and the reluctance of the pole, among other factors. Similarly, the level of the voltage induced in the coil during reading depends upon factors such as the number of coil turns, the strength of the flux presented to the coil as it travels through the yoke, and the reluctance of the yoke. The flux-current relationship in a magnetic head is termed the inductive coupling between the yoke and the coil.

Referring to FIGS. 2A-2C, the ferromagnetic material of the pole pieces 18 includes numerous microscopic regions, called domains 20, within which magnetic dipoles 22 of the material are aligned. The material is formed (by deposition or annealing) in the presence of a directional magnetic field to cause the dipoles 22 of some of the domains 20 to become aligned with (i.e., oriented at an angle of 0 degrees or 180 degrees to) the magnetic field direction. The direction at which the dipoles are aligned represents the preferred axis of magnetization of the pole piece and is called the easy axis 24. The dipole alignment of the domains in the interior of the material and the domains near the edges of the material is such that the magnetic flux generated by the dipoles 22 remains within the material in the absence of an externally applied magnetic field (FIG. 2A).

When magnetic flux is applied to the yoke (either by passing current through the coil during writing or by passing the pole over magnetic flux transitions on the medium during reading) the flux is conducted through the material in one of two ways. One way is by so-called "wall motion", which occurs when the flux 26 is applied in a direction parallel to the easy axis 24 (FIG. 2B). The flux 26 causes domains 20 having dipoles 22 that are aligned with the direction of flux conduction 26 to increase in size (at the expense of those domains whose dipoles are disposed opposite to the flux direction) as magnetic dipoles from adjacent domains reorient themselves (e.g., by 180 degrees) to become aligned with the direction of flux conduction. As each domain grows in size, its walls 21 move to define new boundaries between the domains.

Flux conduction by wall motion is undesirable for several reasons. First, defects, such as impurities, in the material impede the movement of the domain walls 21. When a domain wall encounters an impurity, the impurity temporarily holds (i.e., "pins") the wall at the site of the impurity, preventing it from moving at the point of the impurity. The remainder of the wall continues to move, causing the wall to "stretch" and storing energy in the wall. When the wall stores sufficient energy to free itself from the hold of the impurity, the wall breaks free suddenly, releasing the stored energy as a burst of electrical noise (known as "Barkhausen noise") which obscures the information signal.

The applied flux must exceed a threshold to assure that the walls 21 will be able to gather enough energy to move past the impurities. As a result, flux conduction by wall motion is somewhat insensitive to the low flux levels with which thin film heads are typically used during read operations (that is, the material has low permeability at low flux levels).

In addition, the domain walls 21 cannot be rapidly moved, and as a result, flux conduction by wall motion is unsuitable in applications in which high frequency changes in magnetic flux are encountered.

A second mechanism by which flux is conducted through magnetic material is by rotation of the magnetic dipoles 22 of the domains. This is done by applying the flux 26 in a direction transverse (such as perpendicular) to the easy axis 24 (FIG. 2C). Because domain wall motion is not relied upon to conduct the flux, "pinning" is not encountered and Barkhausen noise is eliminated. Further, the domain dipoles 22 need only rotate slightly to conduct the flux through the material. As a result, flux conduction by rotation is responsive to high frequency flux variations as well as low applied flux levels (that is, permeability is high even at low levels of applied flux).

SUMMARY OF THE INVENTION

One general aspect of the invention is a thin film magnetic transducer formed in multiple layers that includes a yoke having a plurality of arms, at least one of which has segments lying in separate layers and connected through a transition layer, and a multi-turn coil intertwined with the yoke to provide at least two flux interactions between the yoke an coil.

The multiple flux interactions significantly increase the inductive coupling between the yoke and the coil. Thus, compared with transducers that have only a single flux interaction, a given amount of flux conducted by the yoke during reading induces a greater electrical signal in the coil, and during writing an increased level of flux is generated in the yoke in response to the write signal applied to the coil. In general, the induced electrical signal (during reading) and the induced flux (during writing) are increased by a factor equal to the increased number of flux interactions.

Preferred embodiments include the following features.

The coil includes multiple turns and lies at least in part in the transition layer. Multiple coils may be used to further enhance the number of flux interactions. The layers are connected by a via.

The invention also features a thin film magnetic transducer that includes multiple flux-coil interactions and is constructed to enhance flux conduction in the yoke by rotation and minimize conduction by wall motion. Preferably, conduction by rotation predominates that by wall motion. More preferably, conduction by wall motion is limited to 25% (or most preferably, to 10% or less) of the total flux conduction. As a result, the transducer is well suited for use in applications where high frequency changes in magnetic flux occur. The transducer is also highly responsive to low flux levels (that is, the transducer has high permeability at low flux levels). The avoidance of flux conduction by wall motion significantly reduces Barkhausen noise.

In one aspect of this concept, the yoke has a plurality of relatively long arms which extend generally along a first direction and which have an easy axis of magnetization arranged transverse to the first direction so that the flux propagates in the arms predominantly by rotation, and the arms are connected by a relatively short transverse portion. Although flux conducts at least partially by wall motion in the transverse portion, because the length of the transverse portion in minimal rotational conduction through the yoke is favored overall.

Preferred embodiments include the following features.

The easy axis is perpendicular to the first direction. This substantially eliminates conduction by wall motion in the arms. The transverse portion is oriented obliquely to the first direction to reduce the need for flux to conduct by wall motion therein.

Another way in which conduction by wall motion is reduced is to have only two flux interactions between the yoke and coil. This is done by restricting to two the number of the elongated arms, so that the number (and length) of the transverse portions that connect the arms is also limited.

In yet another aspect of the invention, conduction by wall motion is reduced by constructing the transverse yoke arm segments from a plurality of laminated sub-layers that have easy axes of magnetization oriented in different directions. Because flux can conduct by rotation more easily than by wall motion, the flux passing through the transverse segments is transferred back and forth between the sub-layers to find a path through which it can conduct by rotation.

Preferred embodiments include the following features.

The easy axis of one of the sub-layers is perpendicular to the direction along which the segment extends. The easy axes of the sub-layers preferably are orthogonal, but they may be oblique instead. The yoke is arranged so that segments disposed in the same thin film layer are all aligned in the first direction, and the transverse, laminated segments are all disposed in an upper thin film layer (the coil is placed in the transition layer between the two thin film layers). As a result, the laminated sub-layers are formed subsequent to (and are thus spared) the high-temperatures used during manufacture of the coil. The possibly deleterious effects of the high temperature processing on the directionality of the easy axes of the laminated sub-layers are thus avoided.

Another aspect of the invention in which the problems associated with wall motion is avoided is providing at least one (and preferably both) of the yoke arms with elongated segments which are oblique to each other and whose easy axes of magnetization are transverse to the directions of flux flow through the respective segments. One of the oblique segments is joined to the other yoke arm so that flux can pass between the arms without ever flowing completely parallel to the easy axis of either segment.

As a result, the magnetic flux is always constrained to conduct at least partly by rotation because it is never completely parallel to the easy axes of the yoke's magnetic domains.

The following features are included in preferred embodiments.

The oblique segments lie in separate thin film layers, with the segment and the other arm being joined through, e.g., a via between the layers. The oblique segments of each arm also lie in different thin film layers. Segments that are disposed in the same thin film layer all extend in the same general direction and have easy axes perpendicular to this direction.

Another of the invention, which can be used with any of the aspects discussed above, is providing at least one of the yoke arms with a portion of relatively large surface area (i.e., a "magnetic tail") to cause flux to be radiated from the arm to regions adjacent to the transducer preferentially to being conducted to another one of the yoke arms. Preferably, the other arm of the yoke also includes a magnetic tail which receives flux from regions adjacent to the transducer to be coupled into the arm for return to the storage medium.

As a result, the yoke arms need not be connected together to cause the direction of flux conduction to be reversed as the flux is returned from the yoke to the storage medium. Reversing the direction of flux conduction often requires at least some of the flux to be conducted parallel to the easy axis of the yoke. Thus, the use of magnetic tails further avoids conduction by domain wall motion.

Other features and advantages of the invention will become apparent from the following detailed description, and from the claims.

DESCRIPTION OF THE PREFERRED EMBODIMENTS

STRUCTURE AND OPERATION

Figure 1:
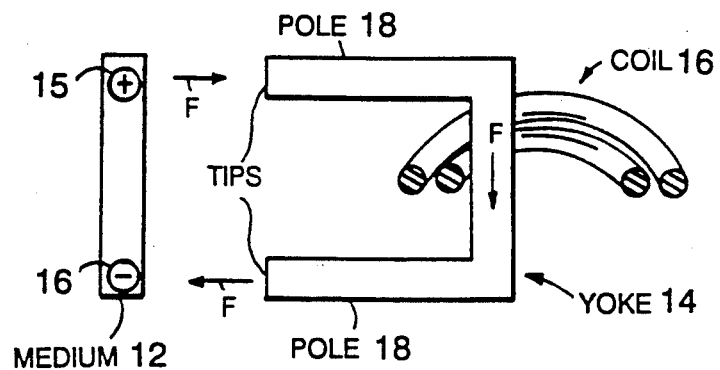
FIG. 1 is a diagrammatic side view of art magnetic head.
Figure 3:
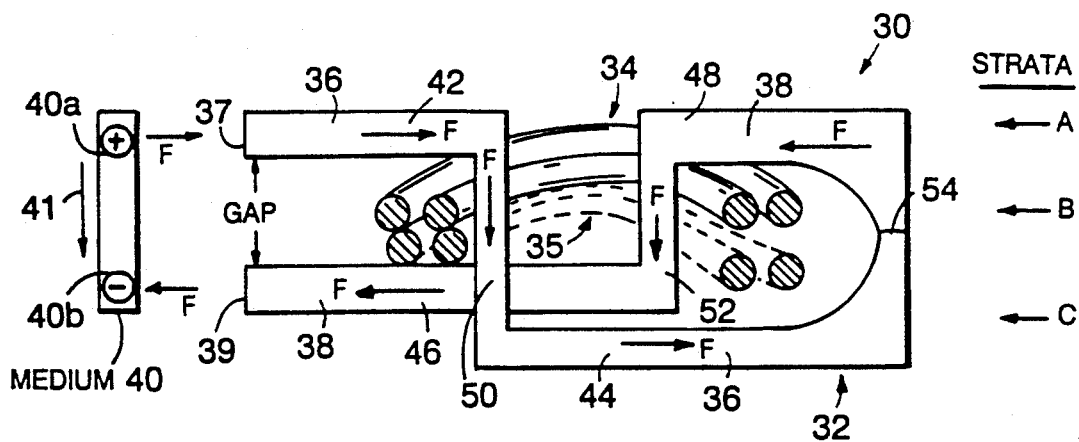
FIG. 3 is a diagrammatic side view of one embodiment of the thin film magnetic head of the invention.
Figure 2A:
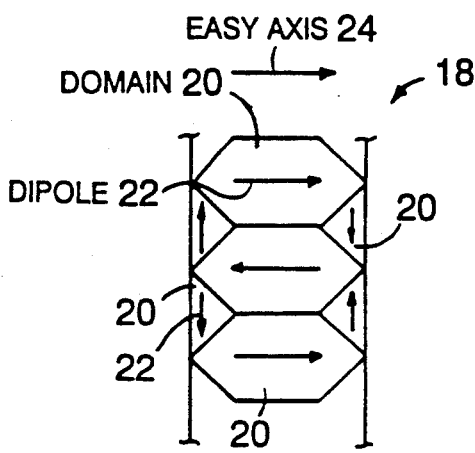
FIGS. 2A-2C illustrate the domain structure of a ferromagnetic material at rest (FIG. 2A), during flux conduction by wall motion (FIG. 2B), and during flux conduction by rotation (FIG. 2C).
Figure 2B:
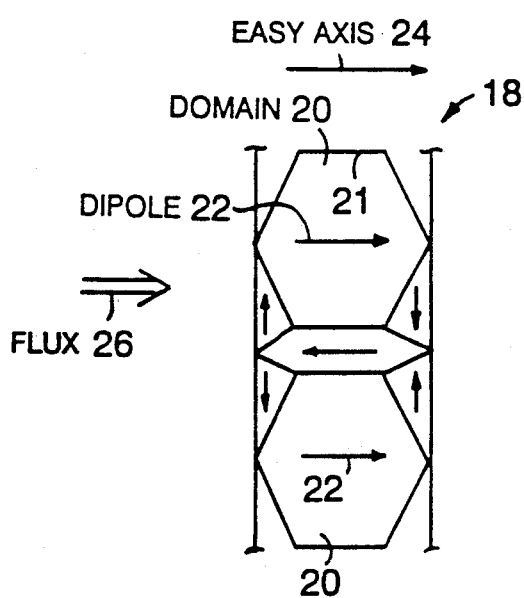
Figure 2C:
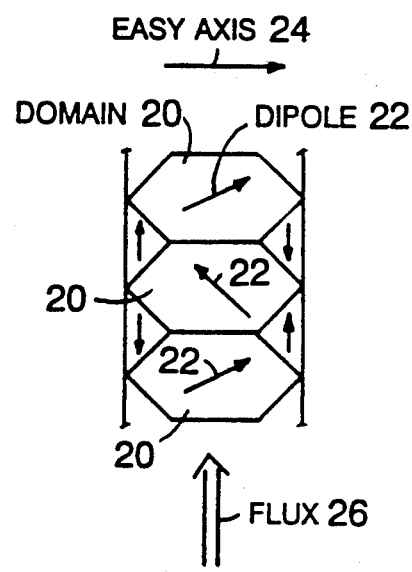

Referring to FIG. 3, thin film magnetic head 30 includes a yoke 32 of ferromagnetic material (such as a nickel iron alloy) intertwined with a multiturn, planar coil 34 (also known as a pancake coil) in such a way as to provide multiple flux interactions between yoke 32 and coil 34 and thereby significantly increase the inductive coupling therebetween as compared with conventional thin film magnetic heads (FIG. 1). Specifically, yoke 32 is constructed with pole pieces 36, 38 (i.e., arms) that are woven through coil 34 so that magnetic flux interacts with coil 34 twice as the flux is conducted through pole pieces 36, 38 to or from magnetic storage medium 40.

Pole piece 36 includes a pair of elongated segments 42, 44 that lie in planes (or strata) A and C, respectively, that are disposed above and below the plane (or strata) B in which coil 34 is disposed. Similarly, pole piece 38 includes a pair of elongated segments 46, 48 that are respectively disposed in strata C and A. Strata B serves as a transition layer to magnetically separate segments 36 and 48 from segments 38 and 44. The ends of segments 42, 46 disposed adjacent to storage medium 40 serve as the tips 37, 39, respectively, of pole pieces 36, 38. Tips 37, 39 are spaced by a gap of predetermined width.

The other end of segment 42 is connected to segment 44 through a via 50 in strata B, which provides a path for the flow of magnetic flux through pole piece 36 that is surrounded by coil 34. Segments 46, 48 of pole piece 38 are similarly connected together through the interior of coil 34 by via 52. Pole pieces 36, 38 are connected together by a third via 54 that passes through strata B to join the ends of segments 44 and 48.

In use, considering a read operation of a pair of magnetic transitions 40a, 40b (collectively called a di-bit) on storage medium 40 (which is travelling in the direction of arrow 41 under head 30), magnetic flux F emanating from positive transition 40a enters the tip 37 of pole piece 36, travels through yoke 32, and returns to negative transition 40b from the tip 39 of pole piece 38. As the flux is conducted through pole pieces 36, 38, it passes through the interior of coil 34 twice in the same direction (i.e., downward as shown in FIG. 3)—once as the flux is coupled by via 50 from segment 42 to segment 44, and again as the flux conducts from segment 48 to segment 46 through via 52.

The electrical signal induced in coil 34 by the passage of flux through pole piece 36 adds to the electrical signal generated in coil 34 by the conduction of the same flux in pole piece 38, resulting in an increased signal relative to a head in which the flux passes through the coil only once. The two-pass configuration shown in FIG. 3 is equivalent to doubling the effective number of turns of coil 34 without physically increasing the number of turns. In general, if the number of coil turns is increased by (n) and the number of passes through the coils is designated by (m), an (n×m) improvement over a single turn coil and single pass yoke is realized by the invention.

By including one or more additional coils 35 (shown in dotted lines in FIG. 3) serially connected to coil 34, the inductive coupling to yoke 32 can be increased still further. For example, head 30 constructed with two coils 34, 35, each of which has 14 turns, would produce the same electrical signal as a conventional head having a single coil with 56 turns (2 coils×14 turns/coil×2 flux passes through each coil=56 turn-flux interactions).

Increasing the effective number of turns without the need to physically build more turns into the coil has a number of advantages. Because the actual length of the coil need not be increased, increases in processing complexity, overall coil inductance, and total coil resistance are avoided.

Figure 4:
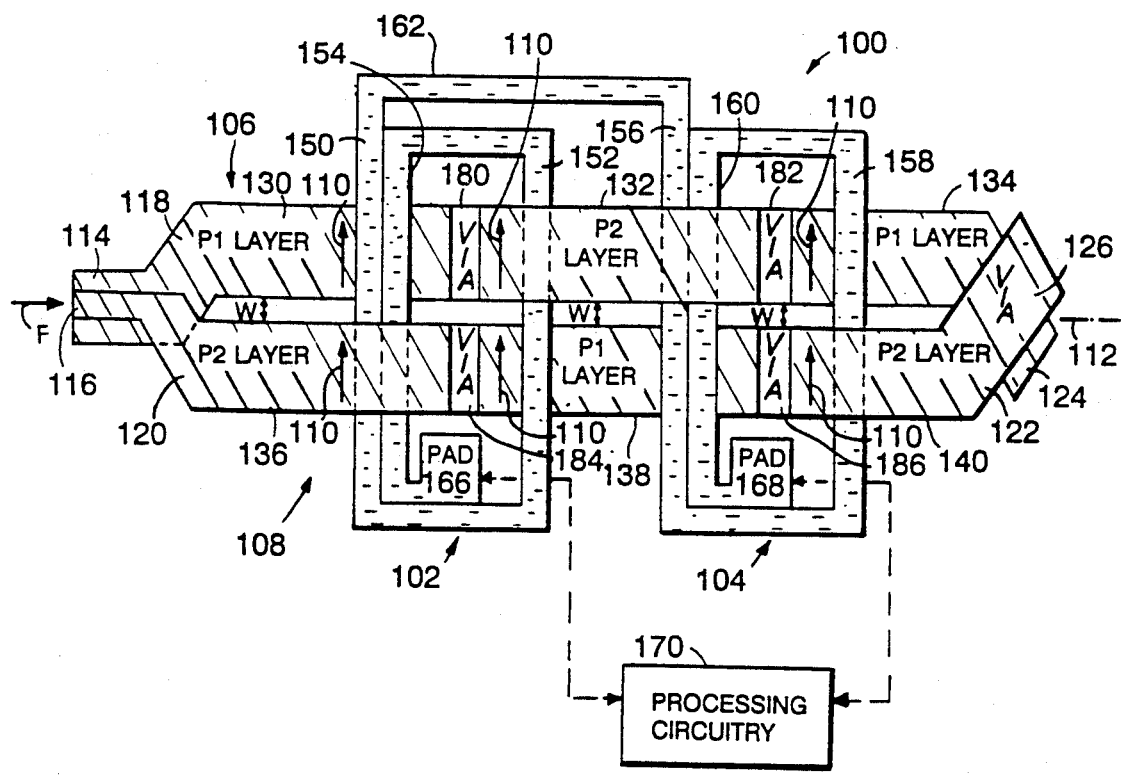
FIG. 4 is a top view of another embodiment of the thin film magnetic head of the invention.

FIG. 4 shows a top view of a thin film magnetic head 100 that includes a pair of planar coils 102, 104 disposed side by side in the same plane in strata B, instead of being stacked, as are coils 34, 35 of FIG. 3. (Because coils 102, 104 are in the same plane, they can be deposited in the same process step, thereby eliminating as many as three hard bake insulating layers, one conducting copper layer, and several via exposures). Each one of a pair of elongated, ferromagnetic pole pieces 106, 108 passes through each coil 102, 104. As discussed below, each pole piece 106, 108 is formed in the presence of a magnetic field to have an easy axis 110 that is in the plane of the pole piece and perpendicular to a longitudinal axis 112 along which the pole pieces 106, 108 are generally disposed.

Pole pieces 106, 108 are spaced apart laterally by a distance W over most of their lengths to limit magnetic flux leakage therebetween and to provide sufficient room for two passes through coils 102, 104. But the tip 114 of pole piece 106 is disposed underneath the tip 116 of pole piece 108 and is spaced therefrom by a gap (see FIG. 3). Tips 114, 116 are parallel to longitudinal axis 112 and are joined to the remainders of respective pole pieces 106, 108 by sections 118, 120, which are disposed at opposite angles with respect to longitudinal axis 112. At the opposite end of head 100, an angled section 122 of pole 108 overlays an oppositely-angled section 124 of pole 106 and is connected thereto by a via 126. Angled sections 118, 120, 122, and 124 also have an easy axis oriented perpendicular to longitudinal axis 112.

Thin film magnetic head 100 is disposed in three layers or strata (strata A-strata C) that are deposited sequentially during fabrication. First, layer p1 is deposited in the presence of a magnetic field to form sections 130 and 134 of pole 106 and section 138 of pole 108 on an insulating substrate (not shown) in strata A. Section 130 includes angled region 118 and tip 114.

After a thin layer of insulation (not shown) is placed over strata A, a copper layer is deposited to form coils 102 and 104 in strata B. Each coil 102, 104 includes numerous turns (each coil is shown with only two turns for clarity). Specifically, coil 102 includes interconnected paths 150, 152, and 154, with paths 156, 158, and 160 forming coil 104. Paths 150 and 156 are interconnected by path 162. Paths 154 and 160 terminate at respective pads 166, 168. Pads 166 and 168 are connected to processing circuitry 170, which drives coils 102, 104 during writing and senses the signals produced on the coils by magnetic flux during reading.

Then, another thin layer of insulation, not shown, is deposited over coils 102, 104, and layer p2 is deposited in the presence of a magnetic field to form section 132 of pole 106 and sections 136 (including tip 116 and angled section 120) and 140 of pole 104 in strata C.

Sections 130, 132, and 134 of pole piece 106 are connected together by forming vias 180, 182 between layers p1 and p2 through strata B. Vias 184, 186 are formed in a similar fashion to interconnect sections 136, 138, and 140 of pole piece 108. Via 126 is formed at this time as well to connect pole pieces 106, 108 together.

In operation, considering a read operation of a di-bit, magnetic flux F from emanating from the positive transition (not shown) enters one of the pole pieces, for example, pole piece 106 through its tip 114. The flux passes through coils 102, 104 twice as it conducts through pole pieces 106, 108: once as the flux passes through segments 130, 132, and 134; and again as the flux is conducted through segments 140, 138, and 136. The flux path is completed by the return of the flux to the negative transition (not shown) from tip 116 of pole piece 108. The electric signal induced by the flux in each coil 102, 104 is thus enhanced.

The magnetic fields that are applied during the deposition of the p1 layer and the p2 layer are oriented in the plane of each layer and perpendicular to longitudinal axis 112 to provide pole pieces 106, 108 with an easy axis 110 that is perpendicular to the elongated sections of the pole pieces (i e., sections 130-140). Thus, throughout most of the length of pole pieces 106, 108, the magnetic flux F travels perpendicular to easy axis 110 and thus is conducted by rotation. (Note that flux conducts by rotation through vias 126 and 180-186 because the vias are disposed perpendicular (i.e., into the paper) to the planes of the pole pieces.)

But the direction of flux conduction is not perpendicular to easy axis 110 in angled sections 118, 120, 122, and 124, and as a result these regions of pole pieces 106, 108 conduct magnetic flux F partially by wall motion. However, pole pieces 106, 108 are constructed and arranged so that the flux conducts through the poles predominantly by rotation rather than by wall motion. Preferably, conduction by wall motion is limited to 25% (most preferably 10% or less) of the total flux conduction. As a result, the deleterious effects of flux conduction by wall motion are minimized.

Because the amount of flux conduction that occurs by wall motion increases as the angle between the flux conduction and easy axis 110 approaches zero, angled sections 118, 120, 122, and 124 are disposed at relatively small oblique angles (e.g., opposite 15 degree angles) with respect to longitudinal axis 112. The flux conducts laterally (with respect to longitudinal axis 112) along the domain walls of angled sections 118, 120, 122, and the small angle that each section makes with the longitudinal axis allows the flux to conduct laterally along several domain walls a once. If the flux encounters a domain wall that is "pinned" by an impurity, it can freely transfer to another wall and continue conduction.

Also, the lengths of the angled sections are small to minimize the extent to which the flux is conducted laterally with respect to longitudinal axis 112. This correspondingly reduces the length over which the flux is conducted by wall motion. For example, the total flux path length provided by pole pieces 106, 108 is approximately 400 microns, but the distance of the flux path laterally with respect to longitudinal axis 112 is less than 30 microns (thus, the ratio of these lengths is greater than 10 to 1).

In addition, the yoke is constructed to minimize the number of times that flux is conducted laterally with respect to longitudinal axis 112 while still achieving multiple passes through each coil 102, 104. That is, while more pole pieces could be added to increase the number of times that the flux is coupled through each coil, to do so would increase the number of times that the flux is conducted laterally to longitudinal axis 112 (and non-perpendicular to easy axis 110) and thereby add to the amount of flux conduction by wall motion. Applicant has found that providing two passes through coils 102, 104 provides an acceptable balance between increased inductive coupling and increased conduction by wall motion.

Other embodiments are within the scope of the following claims.

For example, the easy axis can be induced in other ways other than by depositing or annealing the pole pieces in the presence of a magnetic field. For example, the easy axis can be formed by the so-called "angle of incidence" method in which the ferromagnetic material is deposited at a glancing angle to induce the easy axis at the angle of deposit. Alternatively, the easy axis can be produced by a combined selection of the magnetostrictive properties of the material, the stress fields induced in the material during deposition, and the geometry of the pole.

Figure 5:
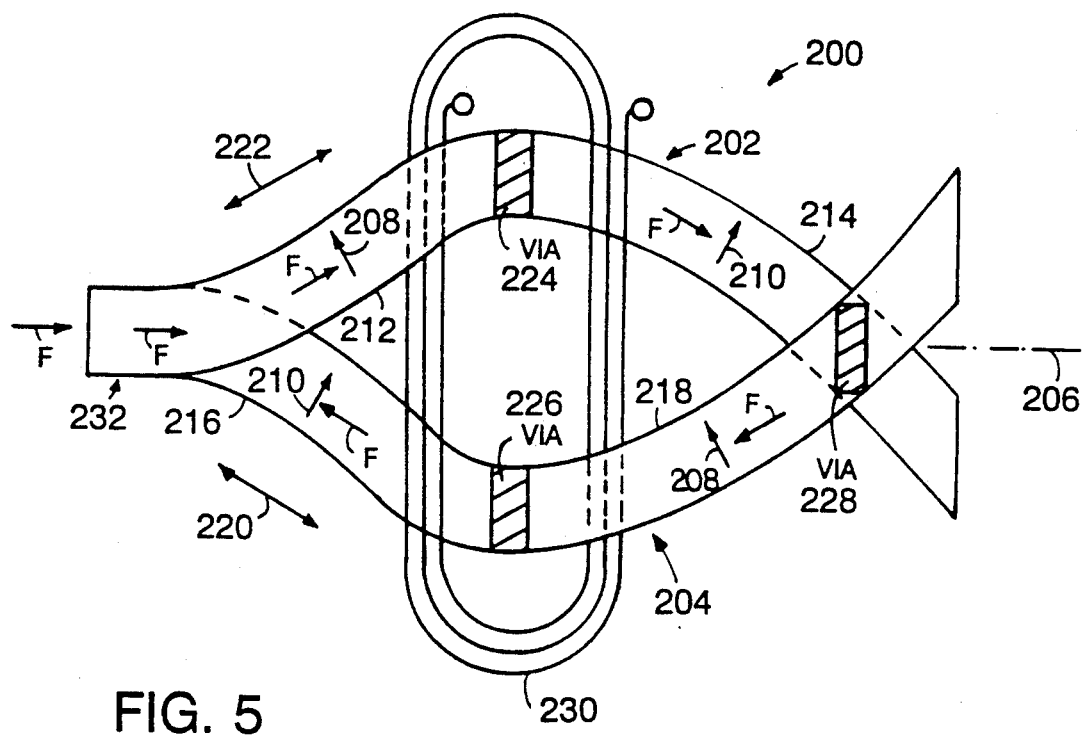
FIG. 5 is a top view of a thin film magnetic head having the general structure of FIG. 3.

Referring to FIG. 5, thin film magnetic head 200 is constructed to reduce the contribution of conduction by wall motion still further. Pole pieces 202, 204 each include a pair of segments that are disposed at oblique angles to the longitudinal axis 206 of head 200 and that have different easy axes 208, 210 oriented perpendicular to each segment. As a result, magnetic flux F flows perpendicular to easy axes 208, 210 and is thus conducted by rotation throughout the entire lengths of pole pieces 202, 204.

Head 200 is fabricated by forming segment 214 of pole 202 and segment 216 of pole 204 parallel to each other and along a line 220 disposed at an angle of approximately 15 degrees to longitudinal axis 206. Segments 214, 216 are formed in the presence of a magnetic field that is oriented perpendicular to the lengths of the segments (i.e., orthogonal to line 220) and in the plane of the segments. After coil 230 is formed, segment 212 of pole 202 and segment 218 of pole 204 are deposited parallel to each other and along a line 222 disposed at an oblique angle to axis 206 opposite to that between line 220 and axis 206. Segments 212, 218 are deposited in the presence of a magnetic field that is perpendicular to line 222 and in the plane of the segments so that the easy axis 208 of segments 212, 218 is perpendicular to the lengths of the segments.

The magnetic flux path through pole pieces 202, 204 is completed by connecting segments 212, 214 together through via 224, interconnecting segments 216, 218 through via 226, and connecting segments 214, 218 together through via 228.

Thus, in operation, magnetic flux F that enters the tip of, e.g., pole piece 202 is conducted down the length of segment 212 by rotation, because the flux is perpendicular to easy axis 208. The flux remains perpendicular to an easy axis (easy axis 210) as it is transferred to segment 214 (and coupled through coil 230 for the first time), and thus the flux is conducted by rotation through segment 214 and into segment 218 for the return trip through coil 230. The flux remains perpendicular to easy axes 208, 210 as it passes through segments 218, 216, and thus completes its conduction through pole piece 204 by rotation.

Near the tips 232 of pole pieces 202, 204, the flux conducts partially by wall motion, because the direction of flux conduction in each pole piece is not strictly perpendicular to easy axes 208, 210. The overall effect of the wall motion is slight, however, due to the short length (e.g., 5 microns) of tips 232.

Figure 6:
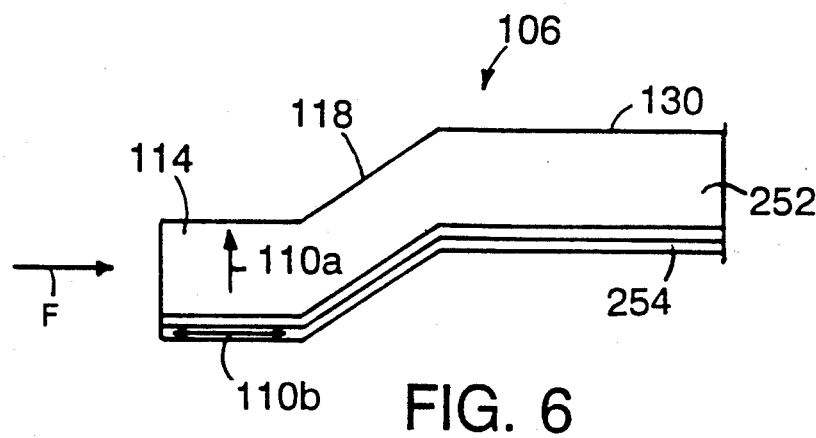
FIG. 6 shows a laminated pole piece according to another embodiment of the thin film magnetic head of the invention.

Referring again to FIG. 4 and to FIG. 6, one way in which flux conduction by rotation can be enhanced (and conduction by wall motion avoided) in thin film head 100 is to form pole pieces 106, 108 from two or more laminated layers that have differently oriented easy axes of magnetization. The use of laminated layers in a thin film head is the subject of U.S. patent application Ser. No. 07/227,808, filed Aug. 3, 1988, by Mallary et al., now U.S. Pat. No. 5,089,334; entitled "Flux Spreading Thin Film Magnetic Devices". The application is assigned to the same assignee as this application and is incorporated herein by reference.

FIG. 6 illustrates segment 130 of pole 106 formed as a pair of laminated layers 252, 254, it being understood that the remaining sections of pole piece 106 and the sections of pole piece 208 are laminated in the same manner. Layers 252 is formed in the presence of a magnetic fields the orientation of which is selected to provide layer 252 with an easy axis 110a disposed perpendicular to the length of segment 130. The direction of the magnetic field in which layer 254 is formed is shifted so that the easy axis 110b of layer 254 is non-perpendicular to the length of segment 130. Ideally, easy axis 110b is oriented perpendicular to easy axis 110a (and is thus arranged parallel to the length of segment 130, as shown in FIG. 6), but axis 110b can alternatively be disposed at a smaller angle with respect to easy axis 110a (for example, 45 degrees, or possibly 20 degrees or less).

In operation, magnetic flux conducts more easily by rotation than by domain wall movement. Stated another way, conduction by domain wall motion presents a higher impedance to the conduction of flux than does conduction by rotation. As magnetic flux F enters segment 130 at tip 114, it conducts entirely by rotation in layer 252 (because there it is perpendicular to easy axis 110a) and thus all of the flux remains in layer 252 at tip 114. When the flux enters angled region 118, it is perpendicular to neither easy axis 110a nor easy axis 110b and thus can not conduct purely by rotation in either layer 252 or layer 254. However, because of the domain structure of layers 252, 254, the flux can conducts by rotation perpendicular to the easy axis of each layer (e.g., layer 252) for a short distance before the domain structure of the layer requires the flux to conduct by wall motion. At this point, the flux is able to conduct by rotation perpendicular to the easy axis of the adjacent layer 254, and as a result, the flux jumps to the adjacent layer so that it can travel through the path of least impedance. The flux continues to jump back and forth between layers 252, 254 along the length of angled region 118 until it reaches the region of section 130 that is oriented perpendicular to easy axis 110a. At this point, the flux can conduct by rotation in layer 252 only, and thus it remains in layer 252 as it passes through the remainder of section 130.

The flux remains in the upper layer as it conducts through sections 132, 134 (i.e., the layer having perpendicular easy axis 110a), until it reaches angled region 124. At this point, the flux jumps between the upper and lower laminated layers 252, 254 as it seeks a path through which it conducts entirely by rotation. The flux resumes conduction in upper layer only when it reaches the region of segment 140 that is disposed parallel to longitudinal axis 112. The flux again conducts through the upper and lower laminated layers when it reaches angled section 120 of pole 108.

Figure 7:
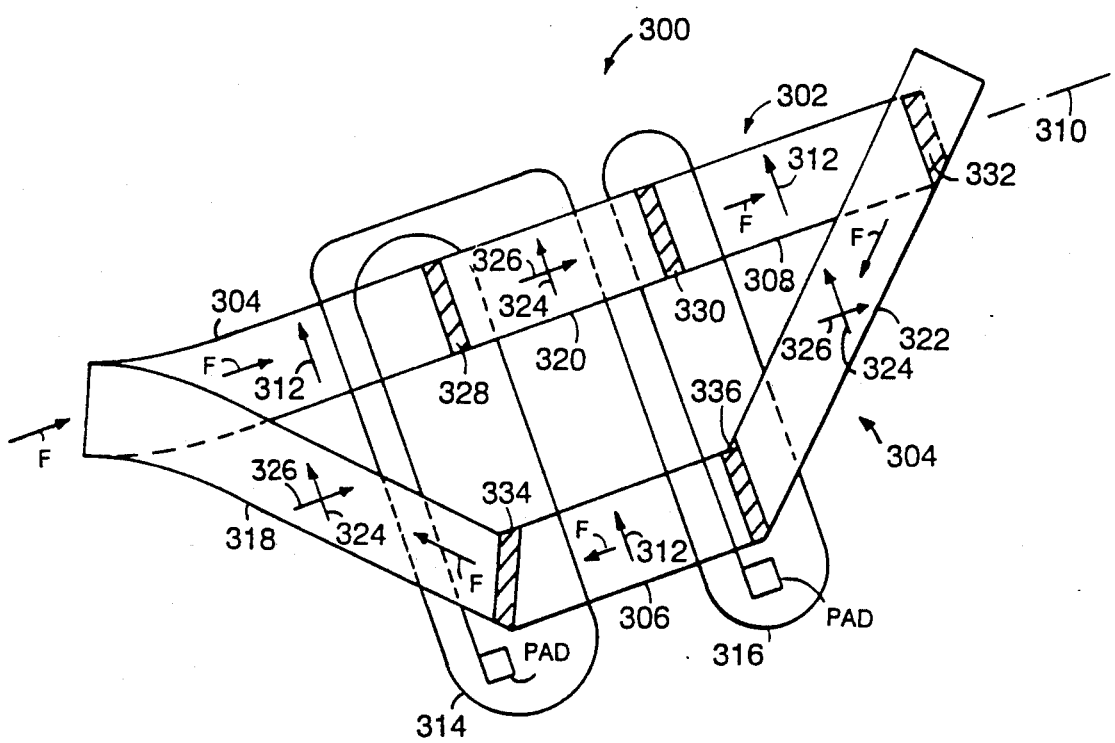
FIG. 7 is a top view of still another embodiment of the thin film magnetic head of the invention.

Referring to FIG. 7, the topology of the pole pieces 302, 304 of thin film head 300 is selected so that lamination of, for example, the pole piece sections in, e.g., strata A (FIG. 3) is unnecessary. The sections 304, 306, and 308 that are deposited in strata A all lie parallel to one another and to axis 310. These sections are formed in the presence of a magnetic field oriented perpendicular to axis 310 so that sections 304, 306, and 308 all have an easy axis 312 disposed perpendicular to their lengths.

After serially coupled coils 314, 316 are fabricated (in strata B), the remaining sections 318, 320, 322 of pole pieces 302, 304 are each formed from a pair of laminated layers. The laminated layers of each section 318, 320, 322 are formed in the presence of orthogonal magnetic fields to have orthogonal easy axes 324, 326, respectively. Easy axis 324 is parallel to easy axis 312, and easy axis 326 is parallel to axis 310, although these orientations are not necessary.

The fabrication of head 300 is completed by forming vias to interconnect the pole piece segments as shown.

In operation, magnetic flux F enters pole piece 302 along longitudinal axis 310 and thus the direction of flux conduction is perpendicular to easy axis 312 of segments 304 and 308, and perpendicular to easy axis 324 of segment 320. Thus, the flux conducts by rotation along the entire length of pole 302.

As the flux returns through pole 304, it also conducts entirely by rotation. This is because the orthogonal easy axes 324, 326 of laminated segments 318 and 322 cause the flux to jump back and forth between the layers of the lamination to find the conduction path of least resistance (as discussed above), and because the direction of flux conduction in segment 306 is perpendicular to easy axis 312.

One advantage of the arrangement of FIG. 7 over a head in which all layers are laminated is that fewer process steps are needed to form the poles. Additionally, because the pole sections disposed underneath (and thus below) coils 314, 316 are not laminated and do not include layers having different easy axes orientations, and there thus is no risk that the relative easy axes orientations could be disturbed by the high processing temperatures used to fabricate the coils.

Figure 8:
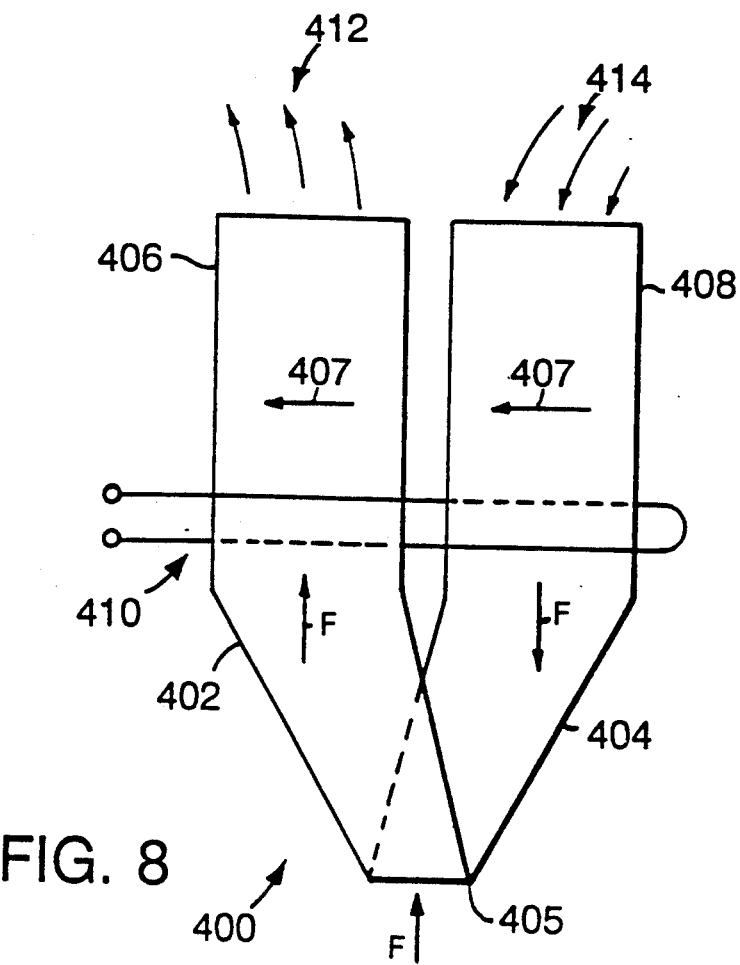
FIG. 8 shows another embodiment of the invention in which the pole pieces are provided with magnetic tails.

Referring to FIG. 8, the pole pieces 402, 404 of thin film magnetic head 400 are provided with regions 406, 406 known as magnetic "tails." Magnetic tails are described in my U.S. Pat. No. 4,931,886, issued Jun. 5, 1990 and entitled "Apparatus and Methods to Suppress Perpendicular Fields in Longitudinal Recording", which is assigned to the present assignee and incorporated herein by reference. Each magnetic tail 406, 408 has a much larger surface area than that of the remainder of the corresponding pole 402, 404. For example, the surface area ratio of each tail to the remainder of the pole is at least 5:1 and preferably 10:1 or greater.

The result is that each tail presents a low impedance leakage path from its pole to the surrounding air, thereby eliminating the need to complete the flux path between poles 402, 404 by connecting the poles together at their far ends (i.e., the ends disposed opposite to tips 405).

In operation, magnetic flux F enters pole 402 from the storage medium (not shown) and is conducted by pole piece through coil 410. The flux is then coupled 412 out of pole piece 402 into the surrounding air via tail 406. Tail 408 acts like an antenna to pull in flux 414 from the surrounding air and couple it as return flux to the storage medium to complete the flux path through head 400. The flux as it conducts through pole 404 passes through coil 410, thereby providing the enhanced inductive coupling between pole pieces 402, 404 and the coil discussed above.

Pole pieces 402, 404 are constructed and arranged according to any of the techniques described above to enhance the conduction of magnetic flux therethrough by rotation. For example, pole pieces 406, 408 have easy axes oriented perpendicularly to the direction of flux conduction through the poles. Because flux F is not required to change direction (i.e., from pole piece 402 to pole piece 404) as flows through head 400, conduction by domain wall motion is further avoided.

I claim:

1. A thin film magnetic transducer formed in a plurality of layers and comprising
   a yoke having a plurality of arms extending generally along a longitudinal axis of said transducer, at least one of said arms having a plurality of segments disposed in separate ones of said layers, said plurality of segments being connected through a transition layer, and
   a plurality of coils spaced longitudinally along said axis and electrically connected together in series, each one of said coils having at least one turn, said yoke and said coils being intertwined to provide at least two flux interactions between said yoke and said at least one turn of each one of said coils.

2. The transducer of claim 1 wherein said yoke is constructed and arranged to conduct flux predominantly by rotation rather than by wall motion.

3. The transducer of claim 2 wherein said yoke is constructed and arranged so that no more than 25% of flux conduction occurs therein by wall motion.

4. The transducers of claim 2 wherein said yoke is constructed and arranged so that no more than 10 flux conduction therein occurs by wall motion.

5. The transducer of claim 1 wherein said layers are connected by a via.

6. The transducer of claim 1 wherein each of said coils lies at least in part in said transition layer.

7. The transducer of claim 6 wherein each one of said coils are disposed entirely in said transition layer.

8. The transducer of claim 1 wherein said plurality of coils are connected together.

9. The transducer of claim 1 wherein each of said coils has at least two turns.

10. A thin film magnetic transducer comprising
    a yoke having a plurality of planar pole pieces each of which includes a tip at a proximal end of said transducer and an arm that extends distally from said tip generally in a longitudinal direction, said tips of said pole pieces being laterally aligned and at least one of said arms being configured to be laterally spaced from another one of said arms over a majority of the lengths of said arms in a direction generally parallel to the planes of said pole pieces,
    said yoke also including a portion extending generally transverse to said longitudinal direction in a direction generally parallel to the planes of said pole pieces for connecting said one of said arms to another one of said arms at a distal end of said transducer, said portion being short relative to said lengths of said arms,
    said arms each having an easy axis of magnetization oriented transverse to said longitudinal direction so that flux will conduct through said arms predominantly by rotation rather than by wall motion, and
    a coil having at least one turn, said yoke and said coil being intertwined to provide at least two flux interactions between said yoke and said at least one turn.

11. The transducer of claim 10 wherein said arms are constructed and arranged so that no more than 25% of flux conduction occurs therein by wall motion.

12. The transducer of claim 10 wherein said arms are constructed and arranged so that no more than 10% of flux conduction therein occurs by wall motion.

13. The transducer of claim 10 wherein said easy axis of magnetization is perpendicular to said longitudinal direction.

14. The transducer of claim 10 wherein said transverse portion of said yoke extends obliquely to said longitudinal direction to reduce the flux conduction by wall motion in said portion.

15. The transducer of claim 10 wherein said yoke comprises only two of said arms, each one of which is intertwined with said coil so that a total of two flux interactions are provided between said yoke and said coil.

16. A thin film magnetic transducer comprising
    a yoke having a plurality of planar arms extending generally along a first direction and laterally spaced from each other over a majority of their lengths In a direction generally parallel to the planes of said arms, said arms being connected together by a portion extending generally parallel to said planes and which is short relative to said lengths of said arms, said arms each having an easy axis of magnetization oriented transverse to said first direction so that flux will conduct through said arms predominantly by rotation rather than by wall motion,
    at least said transverse portion of said yoke including a plurality of layers having different easy axes of magnetization at least one of which is transverse to the direction of flux conduction in said portion to reduce the amount of flux conduction that occurs by wall motion therein, and
    a coil having at least one turn, said yoke and said coil being intertwined to provide at least two flux interactions between said yoke and said at least one turn.

17. The transducer of claim 16 wherein said layers are laminated.

18. The transducer of claim 16 wherein one of said different easy axes of magnetization is perpendicular to said first direction.

19. The transducer of claim 16 wherein at least one of said plurality of arms includes a portion that extends obliquely to said first direction, said portion including said plurality of layers to reduce the amount of flux conduction that occurs by wall motion therein.

20. The transducer of claim 16 wherein said transverse portion extends in a second direction, the easy axis of magnetization of at least one of said layers of said transverse portion being oriented obliquely to said second direction.

21. The transducer of claim 20 wherein the easy axis of magnetization of all of said layers of said transverse portion are oriented obliquely to said second direction.

22. A thin film magnetic transducer comprising
    a yoke having a plurality of arms each of which has at least one easy axis of magnetization, and
    a coil having at least one turn, said yoke and said coil being intertwined to provide at least two flux interactions between said yoke and said at least one turn,
    at least one of said arms having elongated segments each of which is disposed generally along a longitudinal axis of said transducer and has an easy axis of magnetization oriented transverse to the direction of flux conduction through said segment and at an oblique angle with respect to said longitudinal axis, one of said segments being joined to another one of said segments to direct flux through said coil.

23. The transducer of claim 22 wherein said transducer is formed in a plurality of thin film layers, and said segments lie in separate ones of said layers one of said segments of said at least one arm being joined to another one of said arms through an intermediate portion extending between said layers.

24. The transducer of claim 22 wherein said transducer is formed in a plurality of thin film layers with said segments lying in separate ones of said layers and being connected together through a transition layer, said coil lying at least in part in said transition layer.

25. A thin film magnetic transducer comprising
a yoke having a plurality of arms each of which has at least one easy axis of magnetization, and
a coil having at least one turn, said yoke and said coil being intertwined to provide at least two flux interactions between said yoke and said at least one turn,
at least one of said arms having elongated segments each of which is disposed generally along a longitudinal axis of said transducer and has an easy axis of magnetization oriented transverse to the direction of flux conduction through said segment and at an oblique angle with respect to said longitudinal axis, one of said segments being joined to another one of said segments to direct flux through said coil,
said segments being disposed oblique to each other, and the easy axis of each one of said segments being perpendicular to a direction along which said segment generally extends.

26. A thin film magnetic transducer comprising
a yoke having a plurality of arms each of which has at least one easy axis of magnetization, and
a coil having at least one turn, said yoke and said coil being intertwined to provide at least two flux interactions between said yoke and said at least one turn,
each one of said plurality of arms having elongated segments disposed oblique to each other, each of said segments of each of said arms being disposed generally along a longitudinally axis of said transducer and having an easy axis of magnetization oriented transverse to the direction of flux flow through said segment and at an oblique angle with respect to said longitudinal axis, said segments being joined together to direct flux through said coil.

27. The transducer of claim 26 wherein said transducer is formed in a plurality of thin film layers with said oblique segments of each one of said arms lying in separate ones of said layers, the segments that are disposed in a first one of said layers extending generally in a first direction arranged obliquely to said longitudinal axis and having easy axes of magnetization perpendicular to said first direction, and the segments that are disposed in a second one of said layers extending generally in a second direction arranged obliquely to said longitudinal axis and to the first direction and having easy axes of magnetization perpendicular to said second direction.

28. A thin film magnetic transducer formed in a plurality of layers and comprising a yoke having a plurality of arms, at least one of said arms having a plurality of segments disposed in separate ones of said layers, said plurality of segments being connected through a transition layer,
at least one of said arms including a first portion adapted to be disposed adjacent to a storage medium and transfer flux between said arm and said medium, and a second portion that has a large surface area relative to a surface area of said first portion to cause flux in said arm to radiate from said second portion to regions adjacent to said transducer and then to another one of said arms, and
a coil having at least one turn, said yoke and said coil being intertwined to provide at least two flux interactions between said yoke and said at least one turn.

29. A thin film magnetic transducer comprising
a yoke having a plurality of arms extending generally along a first direction and connected by a portion that is short relative to lengths of said arms and that extends generally transverse to said first direction, said arms each having an easy axis of magnetization oriented transverse to said first direction so that flux will conduct through said arms predominantly by rotation rather than by wall motion,
at least one of said arms including a first portion adapted to be disposed adjacent to a storage medium and transfer flux between said arm and said medium, and a second portion that has a large surface area relative to a surface area of said first portion to cause flux in said arm to radiate from said second portion to regions adjacent to said transducer and then to another one of said arms, and
a coil having at least one turn, said yoke and said coil being intertwined to provide at least two flux interactions between said yoke and said at least one turn.

30. A thin film magnetic transducer comprising
a yoke having a plurality of arms, at least one of which includes a plurality of segments, some of said segments extending for flux flow along a first direction, others of said segments extending for flux flow along a direction transverse to said first direction,
at least one of said segments having laminated sublayers, said laminated sub-layers having easy axes of magnetization that have different orientations, and
a coil having at least one turn, said yoke and said coil being intertwined to provide at least two flux interactions between said yoke and said at least one turn.

31. The transducer of claim 30 wherein at least one of the segments that extends for flux flow along a first direction has said laminated sub-layers, the easy axis of one of said sub-layers being perpendicular to said first direction.

32. The transducer of claim 31 wherein the easy axis of another one of the laminated sub-layers of said at least one segment is parallel to said first direction.

33. The transducer of claim 31 wherein the easy axis of another one of the laminated sub-layers of said at least one segment is oblique to said first direction.

34. The transducer of claim 30 wherein said transducer is formed in a plurality of thin film layers, the segments that extend for flux flow along said first direction being disposed in a first one of said layers and having an easy axis of magnetization oriented perpendicular to said first direction, and the segments that extend for flux flow along said transverse direction being disposed in a second one of said layers and having said laminated sub-layers.

35. The transducer of claim 34 wherein one of the laminated sub-layers of said segments that are disposed in said second thin film layer has an easy axis of magnetization perpendicular to said first direction.

36. The transducer of claim 35 wherein said laminated sub-layers of said segments that are disposed in said second thin film layer have orthogonal easy axes.

37. The transducer of claim 34 wherein at least one of the segments in said first layer is connected to a segment in said second layer through a transition layer, with said coil being disposed at least in part in said transition layer.

38. The transducer of claim 37 wherein said second thin film layer is disposed over said transition layer relative to said first layer.

39. The transducer of claim 30 wherein at least one of said arms includes a first portion adapted to be disposed adjacent to a storage medium and transfer flux between said arm and said medium, and a second portion that has a large surface area relative to a surface area of said first portion to cause flux in said arm to radiate from said second portion to regions adjacent to said transducer and then to another one of said arms.

40. The transducer of claim 39, 28 or 29 wherein said another one of said arms includes a first portion adapted to be disposed adjacent to said storage medium, and a second portion of large surface area relative to a surface area of said first portion to cause flux in regions adjacent to said transducer to be conducted into said arm for conduction to said medium via said first portion.

41. The transducer of claim 40 wherein said coil is intertwined with each one of said arms in a region intermediate said first portion and said second portion.

42. A thin film magnetic transducer comprising
a yoke having a plurality of arms each of which has at least one easy axis of magnetization, and
a coil having at least one turn, said yoke and said coil being intertwined to provide at least two flux interactions between said yoke and said at least one turn,
at least one of said arms having elongated segments oblique to each other and having easy axes of magnetization respectively transverse to the directions of flux conduction through said segments, one of said oblique segments being joined to another of said arms so that flux can pass between said arms without flowing parallel to the easy axis of either said segment or said other arm,
at least one of said arms including a first portion adapted to be disposed adjacent to a storage medium and transfer flux between said arm and said medium, and a second portion that has a large surface area relative to a surface area of said first portion to cause flux in said arm to radiate from said second portion to regions adjacent to said transducer and then to another one of said arms.

43. The transducer of claim 42 wherein said another one of said arms includes a first portion adapted to be disposed adjacent to a storage medium and transfer flux between said arm and said medium, and a second portion of large surface area relative to a surface area of said first portion to cause flux in regions adjacent to said transducer to be conducted into said arm for conduction to said medium via said first portion.

* * * * *

UNITED STATES PATENT AND TRADEMARK OFFICE
CERTIFICATE OF CORRECTION

PATENT NO.   : 5,184,267

DATED        : February 2, 1993

INVENTOR(S)  : Michael L. Mallary

It is certified that error appears in the above-identified patent and that said Letters Patent is hereby corrected as shown below:

In the references cited section:

4,931,886 issue date "6/1990" should be --6/1988--.

The Lazzari reference "31903193" should be --3190-3193--.

Col. 2, line 53, "an" should be --and--.

Col. 4, after line 44, insert --We briefly describe the drawings.--
    line 45, after "of" insert --a prior--.

Col. 7, line 41, "a" (first occurrence) should be --at--.

UNITED STATES PATENT AND TRADEMARK OFFICE
CERTIFICATE OF CORRECTION

PATENT NO.  : 5,184,267

DATED       : February 2, 1993

INVENTOR(S) : Michael L. Mallary

It is certified that error appears in the above-identified patent and that said Letters Patent is hereby corrected as shown below:

Col. 11, line 5, after "as" insert --it--.

Col. 11, claim 4, line 29, after "10" insert --% of--.

Col. 12, claim 16, line 20 "In" should be --in--.

line 22 after "generally" insert
--transverse to said first direction in a direction--.

Signed and Sealed this

Ninth Day of May, 1995

Attest:

BRUCE LEHMAN

Attesting Officer

Commissioner of Patents and Trademarks